United States Patent
Ikram et al.

(10) Patent No.: US 7,321,564 B2
(45) Date of Patent: Jan. 22, 2008

(54) HYBRID IMMSE-LMMSE RECEIVER PROCESSING TECHNIQUE AND APPARATUS FOR A MIMO WLAN

(75) Inventors: Muhammad Zubair Ikram, Richardson, TX (US); Srinath Hosur, Plano, TX (US); Michael O. Polley, Garland, TX (US); Manish Goel, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 835 days.

(21) Appl. No.: 10/765,009

(22) Filed: Jan. 26, 2004

(65) Prior Publication Data

US 2005/0163041 A1    Jul. 28, 2005

(51) Int. Cl.
*H04J 1/16* (2006.01)
(52) U.S. Cl. .............. 370/252; 370/204; 370/206; 370/208; 370/338
(58) Field of Classification Search ........... 370/204, 370/206, 207, 208, 252, 338; 375/260, 262
See application file for complete search history.

(56) References Cited

U.S. PATENT DOCUMENTS

| | | | | |
|---|---|---|---|---|
| 6,144,711 | A * | 11/2000 | Raleigh et al. | 375/347 |
| 7,016,297 | B2 * | 3/2006 | Tang et al. | 370/204 |
| 7,158,482 | B2 * | 1/2007 | Love et al. | 370/252 |
| 2004/0116112 | A1 * | 6/2004 | Gray | 455/423 |
| 2004/0223449 | A1 * | 11/2004 | Tsuie et al. | 370/204 |
| 2004/0242179 | A1 * | 12/2004 | Onggosanusi et al. | 455/296 |
| 2005/0088959 | A1 * | 4/2005 | Kadous | 370/208 |
| 2005/0152317 | A1 * | 7/2005 | Awater et al. | 370/338 |
| 2007/0121741 | A1 * | 5/2007 | Tang et al. | 375/260 |

* cited by examiner

*Primary Examiner*—Chirag G. Shah
*Assistant Examiner*—Kan Yuen
(74) *Attorney, Agent, or Firm*—Steven A. Shaw; W. James Brady; Frederick J. Telecky, Jr.

(57) ABSTRACT

A Hybrid IMMSE-LMMSE receiver processing technique predicts performance of and selects between iterative and non-iterative decoding of symbols based on an intelligent metric. Based on a pre-specified criterion, the receiver determines if a correct first-stage decision is made or not. If a correct decision is made, then it follows iterative processing like in BLAST. Alternatively, if a wrong decision is found to have occurred, the receiver resorts to LMMSE estimation processing.

11 Claims, 1 Drawing Sheet

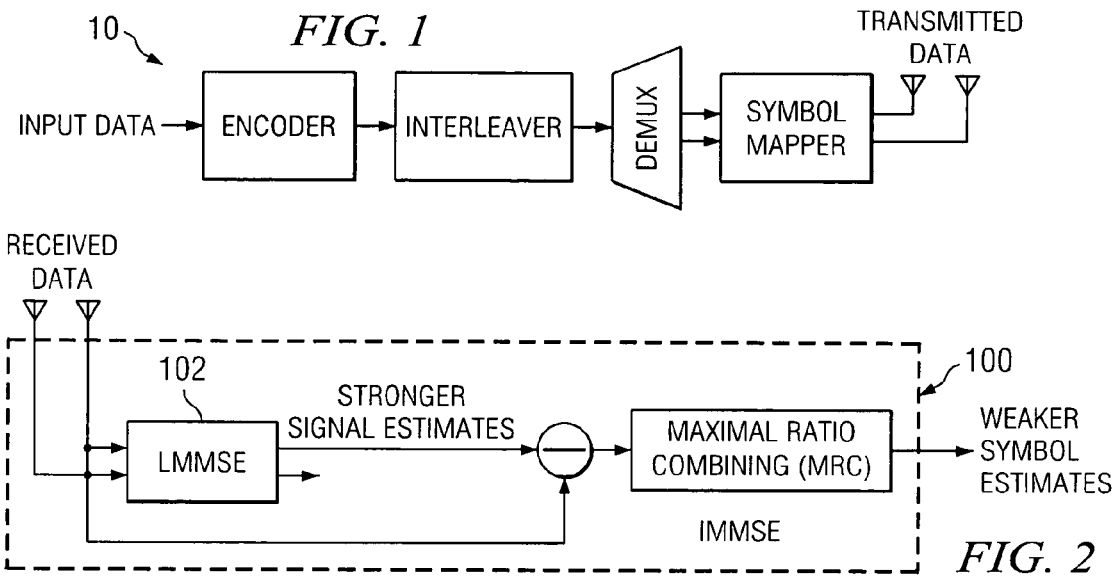
FIG. 1
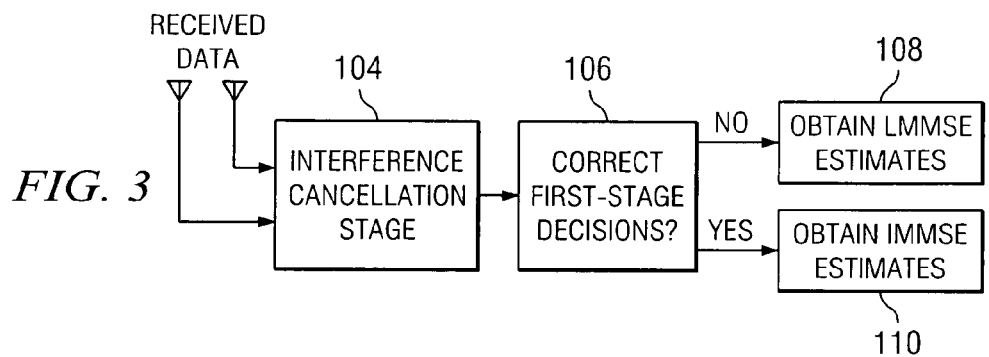
FIG. 2
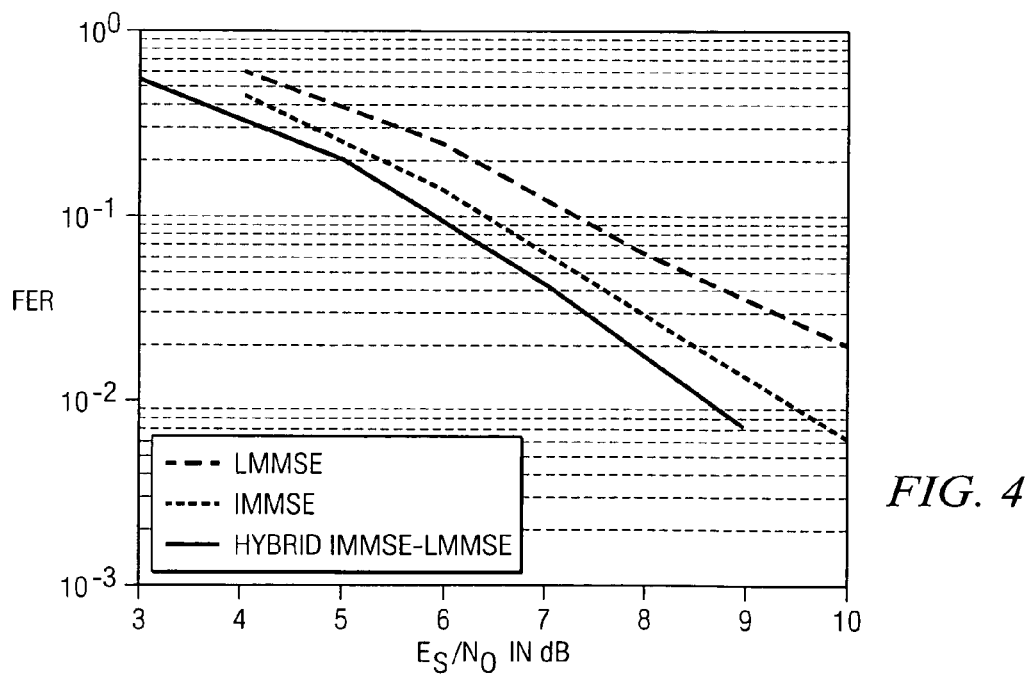
FIG. 3
FIG. 4

HYBRID IMMSE-LMMSE RECEIVER PROCESSING TECHNIQUE AND APPARATUS FOR A MIMO WLAN

BACKGROUND OF THE INVENTION

1. Field of the Invention

This invention relates generally to wireless local area networks, and more particularly to a hybrid iterative minimum mean-squared error estimation (IMMSE)—linear minimum mean-squared error estimation (LMMSE) receiver processing technique and apparatus for a multiple-input multiple-output (MIMO) wireless local area network (WLAN).

2. Description of the Prior Art

The performance of the next-generation MIMO WLANs depends heavily on the signal processing performed at the receiver. Foschini et al. in 1996, proposed a novel technique that exploits the channel multipaths in MIMO systems to achieve near-Shannon capacity. This technique, referred to as Bell Labs Layered Space-Time Architecture (BLAST), operates on a "cancellation" and "nulling" principle, where the transmitted signal received via the strongest of the multiple channels is decoded first and subtracted from the received data stream. This is followed by iterative decoding of the next strongest signal and so on. Note that since the second signal is estimated in the presence of one less than the total number of received signals, its estimation variance is generally less than if it were estimated in a non-iterative manner in the presence of all signals. It has been shown however, that the iterative BLAST algorithm offers best performance only if correct signal decoding order is determined. In the case of an incorrect decoding order, the performance of this iterative scheme is sometimes found to be even worse than a conventional non-iterative signal processing technique like LMMSE estimation.

In view of the foregoing, it would be both beneficial and advantageous to provide a receiver that predicts performance of and selects between iterative and non-iterative decoding of symbols based on an intelligent metric.

SUMMARY OF THE INVENTION

To meet the above and other objectives, the present invention provides a receiver that predicts performance of and selects between iterative and non-iterative decoding of symbols based on an intelligent metric. Based on a pre-specified criterion, the receiver determines if a correct first-stage decision is made or not. If a correct decision is made, then it follows iterative processing like in BLAST. Alternatively, if a wrong decision is found to have occurred, the receiver resorts to LMMSE estimation processing.

More specifically, a hybrid iterative/non-iterative receiver technique is employed to decode constellations transmitted on subchannels of orthogonal frequency division multiplexed (OFDM) symbols transmitted in a MIMO system. The technique makes intelligent choices between iterative and non-iterative processing at the receiver, resulting in improved performance.

According to one embodiment, a method of decoding a constellation transmitted on subchannels of OFDM symbols transmitted in a MIMO WLAN system comprises the steps of:

receiving a constellation of transmitted OFDM symbols;

decoding the OFDM symbol having the highest SNR among the received OFDM symbols;

estimating the probability that the correct OFDM symbol has been decoded;

decoding the next higher-SNR OFDM symbol via LMMSE processing if the probability of error exceeds a predetermined threshold; and subtracting the contribution of decoded symbol from the received signal followed by decoding the next higher-SNR OFDM symbol via IMMSE processing if the probability of error does not exceed the predetermined threshold.

According to another embodiment, a hybrid IMMSE-LMMSE receiver comprises:

an interference cancellation first stage operational to receive a constellation of transmitted OFDM symbols and decode the OFDM symbol having the highest SNR among the received OFDM symbols;

algorithmic software to estimate the probability that the correct OFDM symbol has been decoded;

an LMMSE processing stage operational to decode the next higher-SNR OFDM symbol via LMMSE processing if the probability of error exceeds a predetermined threshold; and an IMMSE processing stage operational to decode the next higher-SNR OFDM symbol via IMMSE processing if the probability of error does not exceed the predetermined threshold.

BRIEF DESCRIPTION OF THE DRAWINGS

Other aspects and features of the present invention and many of the attendant advantages of the present invention will be readily appreciated, as the invention becomes better understood by reference to the following detailed description when considered in connection with the accompanying drawing figures thereof and wherein:

FIG. 1 is a simplified block diagram illustrating a two-antenna BLAST transmitter;

FIG. 2 is a simplified block diagram illustrating two-antenna dual-stage IMMSE decoding at a receiver;

FIG. 3 is a simplified block diagram illustrating switching between IMMSE and LMMSE in BLAST processing; and FIG. 4 is a set of plots illustrating a comparison of LMMSE, IMMSE and Hybrid IMMSE-LMMSE processing schemes for a 2-input 2-output (2×2) MIMO system.

While the above-identified drawing figures set forth particular embodiments, other embodiments of the present invention are also contemplated, as noted in the discussion. In all cases, this disclosure presents illustrated embodiments of the present invention by way of representation and not limitation. Numerous other modifications and embodiments can be devised by those skilled in the art, which fall within the scope and spirit of the principles of this invention.

DETAILED DESCRIPTION OF THE PREFERRED EMBODIMENTS

In order to facilitate a better understanding of the embodiments described herein below, the iterative and non-iterative processing in BLAST and the conditions under which each of these methods is suited for operation is first set forth. The embodiments described herein relate to a hybrid iterative/non-iterative receiver technique to decode constellations transmitted on subchannels of OFDM symbols transmitted in a MIMO system, as stated herein before. This technique makes an intelligent choice between iterative and non-iterative processing at the receiver, resulting in improved performance, as also stated herein before. In order to preserve brevity and to enhance clarity, the discussions herein are limited to the version of BLAST known as vertical-BLAST (V-BLAST).

MIMO

A multi-antenna WLAN transmitter produces a set of signals that each pass through separate signal paths for digital modulation, analog and radio frequency processing, and wireless transmission over the antennas. There are several examples of prior art systems designed for multiple-input antennas and multiple-output antennas, where the transmitter splits and encodes the transmit signals in a manner such that the receiver can exploit a diverse channel and knowledge of the encoding and achieve the highest possible rate, reach, and throughput. The MIMO algorithm employed in these designs typically attempts to achieve a linear increase in data rate as the number of transmit and receive antennas increase linearly. With two transmit and two receive antennas, for example, one can theoretically double the data rate. The encoding technique of splitting a transmit signal in time, and distributing the signal across the transmit antennas in space has become known as space-time coding. When combined with a multicarrier modulation scheme such as OFDM, this is often referred to as space-time-frequency coding. A multi-antenna MIMO receiver is responsible for processing the received signal to effectively determine the data transmitted from each transmit antenna.

V-BLAST

The Vertical Bell Labs Layered Space-Time coding scheme transmits data symbols over multiple antennas. The V-BLAST transmitter 10 for a (2×2) case is depicted in FIG. 1. The conventional V-BLAST receiver operates on the principle of "canceling" and "nulling." Due to spatial diversity at the receiver, one of the two transmitted signals is received "hopefully" with a better signal-to-noise ratio (SNR) than the other. In V-BLAST processing, the signal received with the higher SNR is decoded first. This constitutes the interference canceling step. The correct detection order is determined at the receiver from the estimated channel matrix and noise variance. The contribution of detected symbol is then removed from the composite two-antenna signal in the nulling step. The weaker signal estimates are then obtained using maximal-ratio combining (MRC). Note that the stronger signal can be decoded in many possible ways; e.g., LMMSE or zero-forcing equalization (ZFE). The embodiment described herein employs LMMSE, however, because of its better immunity against additive noise. The foregoing two-stage decoding procedure at the receiver is herein referred to as iterative MMSE (IMMSE) processing in V-BLAST. This two antenna dual-stage IMMSE decoding 100 at the receiver is illustrated in FIG. 2.

Error Propagation in V-BLAST

It should be noted that in IMMSE processing, the recovery of a weaker symbol relies heavily on the prior estimation of the stronger symbol. The construction of the IMMSE V-BLAST receiver shown in FIG. 2, therefore, exposes the weaker symbol to estimation errors in case the stronger symbol is not obtained accurately. An example of the case where the first signal is not correctly decoded is when the V-BLAST detection order is incorrectly determined.

An alternative non-iterative receiver processing arrangement is to estimate the two signals independently of each other using LMMSE processing. These estimates are obtained at the output of LMMSE block 102 seen in FIG. 2. This is, however, also not favored since each signal is then estimated in the presence of the interfering noise caused by the other.

Switching between LMMSE and IMMSE V-BLAST Processing

Consider now the hypothetical case, where it is known that an error is made in the detection of the signal in the first stage. We know that using this incorrectly estimated first signal in the nulling stage will cause a certain misdetection in the second stage as well. In this case, however, an intelligent choice is to do (non-iterative) LMMSE processing on both the received signals with a hope that at least one signal (for the 2×2 case) is estimated correctly.

The present inventors investigated the viability of the foregoing switching methodology by assuming a prior knowledge whether an error is made or not in the detection of a signal first in order. Even though this information is not available in practice, the objective by assuming its knowledge was to assess any advantage gained in terms of an improvement in receiver performance. The processing was implemented as shown in FIG. 3; in case a signal detection error is made in the first stage as shown in blocks 104 and 106, LMMSE estimates are obtained as shown in block 108 for signals sent from both the transmit antennas. Otherwise, IMMSE processing is carried out as shown in block 110.

The switching between IMMSE and LMMSE in V-BLAST processing requires the information whether correct first-stage decisions were made or not, as stated herein before. In general, such information is not directly available, and some metric should be devised to infer it. This metric can be a function of additive noise variance, propagation channel matrix, etc. Once such a metric is developed, the switching between IMMSE and LMMSE can be done in an automatic fashion. The resulting technique is herein after referred to as "Hybrid IMMSE-LMMSE Receiver Processing Scheme."

One such technique of devising a metric that is based on computing the probability of making an incorrect decision in the first-stage detection is now described herein below. Results are shown for the case of BPSK symbols, which has also been extended to the case of a QPSK signal constellation.

Given now the first-stage detected symbols $\bar{s}$ (prior to hard slicing), the probability that an error has been made is given by $$P_{e|\bar{s}} = \frac{e^{-|\bar{s}|/\sigma^2}}{e^{-|\bar{s}|/\sigma^2} + e^{\bar{s}/\sigma^2}},$$

where $\sigma^2$ is the MMSE interference noise power in the estimation of the first-stage symbol. With a knowledge of $P_{e|\bar{s}}$, a decision can now be made between the selection of LMMSE and IMMSE data processing by using the following simple criterion:

if $P_{e|\bar{s}} > 0.4$ do LMMSE processing otherwise do IMMSE processing

The selection of a threshold of 0.4 simply follows from the fact that if more likely an error has occurred in the first-stage detection, then take LMMSE estimates of the data symbols transmitted over the two antennas. Otherwise, do an iterative processing for detection of the second (weaker) data symbol. Note that other values for $P_{e1\bar{s}}$ can be selected. The present inventors found however, that a value of 0.4 worked best for BSPK as well as QPSK signal constellations.

The inventors confirmed the efficacy of the foregoing scheme by carrying out a desired number of simulations. A (2×2) BPSK system with a Rate ¾ convolutional code was considered. For a packet size of 200 bytes, a random-burst interleaver was employed, and transmitter-receiver system performance was gauged by plotting the frame-error rate (FER) against the transmit SNR $E_s/N_o$. The results are shown in FIG. 4 that illustrates a performance comparison of LMMSE, IMMSE and the Hybrid IMMSE-LMMSE processing schemes for a (2×2) system. It can be easily seen that the Hybrid IMMSE-LMMSE scheme outweighs both of the other options.

In view of the above, it can be seen that the present invention presents a significant advancement in the art of signal processing. Further, this invention has been described in considerable detail in order to provide those skilled in the MIMO WLAN art with the information needed to apply the novel principles and to construct and use such specialized components as are required. In view of the foregoing descriptions, it should further be apparent that the present invention represents a significant departure from the prior art in construction and operation. However, while particular embodiments of the present invention have been described herein in detail, it is to be understood that various alterations, modifications and substitutions can be made therein without departing in any way from the spirit and scope of the present invention, as defined in the claims which follow.

What is claimed is:

1. A method of decoding a constellation transmitted on subchannels of orthogonal frequency division multiplexed (OFDM) symbols in a wireless communication system, the method comprising:
   receiving a signal comprising a constellation of transmitted OFDM symbols;
   decoding an OFDM symbol having a higher signal-to-noise ratio (SNR) among the received OFDM symbols;
   estimating the probability that a correct OFDM symbol has been decoded;
   decoding the next higher SNR OFDM symbol via linear minimum mean-squared error estimation (LMMSE) processing if the probability of error exceeds a predetermined threshold; and
   subtracting the contribution of decoded symbol from the received signal followed by decoding the next higher-SNR OFDM symbol via iterative minimum mean-squared error estimation (IMMSE) processing if the probability of error does not exceed the predetermined threshold.

2. The method according to claim 1, wherein the constellation of transmitted OFDM symbols is selected from a group consisting of BPSK symbols, and QPSK symbols.

3. The method according to claim 1, wherein decoding the OFDM symbol having the higher SNR among the received OFDM symbols comprises decoding via LMMSE signal processing.

4. The method according to claim 1, wherein decoding the OFDM symbol having the lower SNR among the received OFDM symbols comprises decoding via maximal-ratio combining.

5. The method according to claim 1, wherein estimating the probability that the correct OFDM symbol has been decoded comprises estimating a function metric selected from the group consisting of additive noise variance, propagation channel matrix, and minimum mean-squared error (MMSE) interference noise power.

6. The method according to claim 1, wherein decoding the next OFDM symbol via LMMSE processing if the probability of error exceeds a predetermined threshold comprises estimating whether $$P_{e1\bar{s}} = \frac{e^{-|\bar{s}|/\sigma^2}}{e^{-|\bar{s}|/\sigma^2} + e^{\bar{s}/\sigma^2}}$$

is greater than a predetermined threshold, wherein $\sigma^2$ is the minimum mean-squared error (MMSE) interference noise power of the first-stage symbol, and further wherein $\bar{s}$ represents the first-stage detected symbols prior to hard slicing.

7. The method according to claim 1, wherein decoding the next OFDM symbol via IMMSE processing if the probability of error does not exceed the predetermined threshold comprises estimating whether $$P_{e1\bar{s}} = \frac{e^{-|\bar{s}|/\sigma^2}}{e^{-|\bar{s}|/\sigma^2} + e^{\bar{s}/\sigma^2}}$$

is not greater than a predetermined threshold, wherein $\sigma^2$ is the minimum mean-squared error (MMSE) interference noise power of the first-stage symbol, and further wherein $\bar{s}$ represents the first-stage detected symbols prior to hard slicing.

8. A hybrid iterative minimum mean-squared error estimation-linear minimum mean-squared error estimation (IMMSE-LMMSE) receiver comprising:
   an interference cancellation first stage operational to receive a constellation of transmitted orthogonal frequency division multiplexed (OFDM) symbols and decode the OFDM symbol having a higher signal-to-noise ratio (SNR) among the received OFDM symbols;
   algorithmic software to estimate the probability that the correct OFDM symbol has been decoded;
   an LMMSE processing stage operational to decode the next OFDM symbol via LMMSE processing if the probability of error exceeds a predetermined threshold;
   nulling means for subtracting the contribution of decoded symbol from the received signal followed by decoding the next higher-SNR OFDM symbol via IMMSE processing if the probability of error does not exceed the predetermined threshold; and
   an IMMSE processing stage operational to decode the next OFDM symbol via IMMSE processing if the probability of error does not exceed the predetermined threshold.

9. The hybrid IMMSE-LMMSE receiver according to claim 8, wherein the algorithmic software to estimate the probability that the correct OFDM symbol has been decoded is configured to estimate a function metric selected from the group consisting of additive noise variance, propagation channel matrix, and minimum mean-squared error (MMSE) interference noise power.

10. A hybrid iterative minimum mean-squared error estimation-linear minimum mean-squared error estimation (IMMSE-LMMSE) receiver comprising:
   an interference cancellation first stage operational to receive a constellation of transmitted orthogonal frequency division multiplexed (OFDM) symbols and decode the OFDM symbol having the higher signal-to-noise ratio (SNR) among the received OFDM symbols;

algorithmic software to estimate the probability that the correct OFDM symbol has been decoded;

an LMMSE processing stage operational to decode the next OFDM symbol via LMMSE processing if the probability of error exceeds a predetermined threshold; and an IMMSE processing stage operational to decode the next OFDM symbol via IMMSE processing if the probability of error does not exceed the predetermined threshold.

wherein the algorithmic software to estimate the probability that the correct OFDM symbol has been decoded is configured to estimate whether a metric defined by $$P_{e1\bar{s}} = \frac{e^{-|\bar{s}|/\sigma^2}}{e^{-|\bar{s}|/\sigma^2} + e^{\bar{s}/\sigma^2}}$$

is greater than a predetermined threshold, wherein $\sigma^2$ is the minimum mean-squared error (MMSE) interference noise power of the first-stage symbol, and further wherein $\bar{s}$ represents the first-stage detected symbols prior to hard slicing.

11. A hybrid iterative minimum mean-squared error estimation-linear minimum mean-squared error estimation (IMMSE-LMMSE) receiver comprising:

an interference cancellation first stage operational to receive a constellation of transmitted orthogonal frequency division multiplexed (OFDM) symbols and decode the OFDM symbol having the higher signal-to-noise ratio (SNR) among the received OFDM symbols;

algorithmic software to estimate the probability that the correct OFDM symbol has been decoded;

an LMMSE processing stage operational to decode the next OFDM symbol via LMMSE processing if the probability of error exceeds a predetermined threshold; and an IMMSE processing stage operational to decode the next OFDM symbol via IMMSE processing if the probability of error does not exceed the predetermined threshold.

wherein the algorithmic software to estimate the probability that the correct OFDM symbol has been decoded is configured to estimate whether a metric defined by $$P_{e1\bar{s}} = \frac{e^{-|\bar{s}|/\sigma^2}}{e^{-|\bar{s}|/\sigma^2} + e^{\bar{s}/\sigma^2}}$$

is not greater than a predetermined threshold, wherein $\sigma^2$ is the minimum mean-squared error (MMSE) interference noise power of the first-stage symbol, and further wherein $\bar{s}$ represents the first-stage detected symbols prior to hard slicing.

* * * * *